United States Patent Office 3,216,080
Patented Nov. 9, 1965

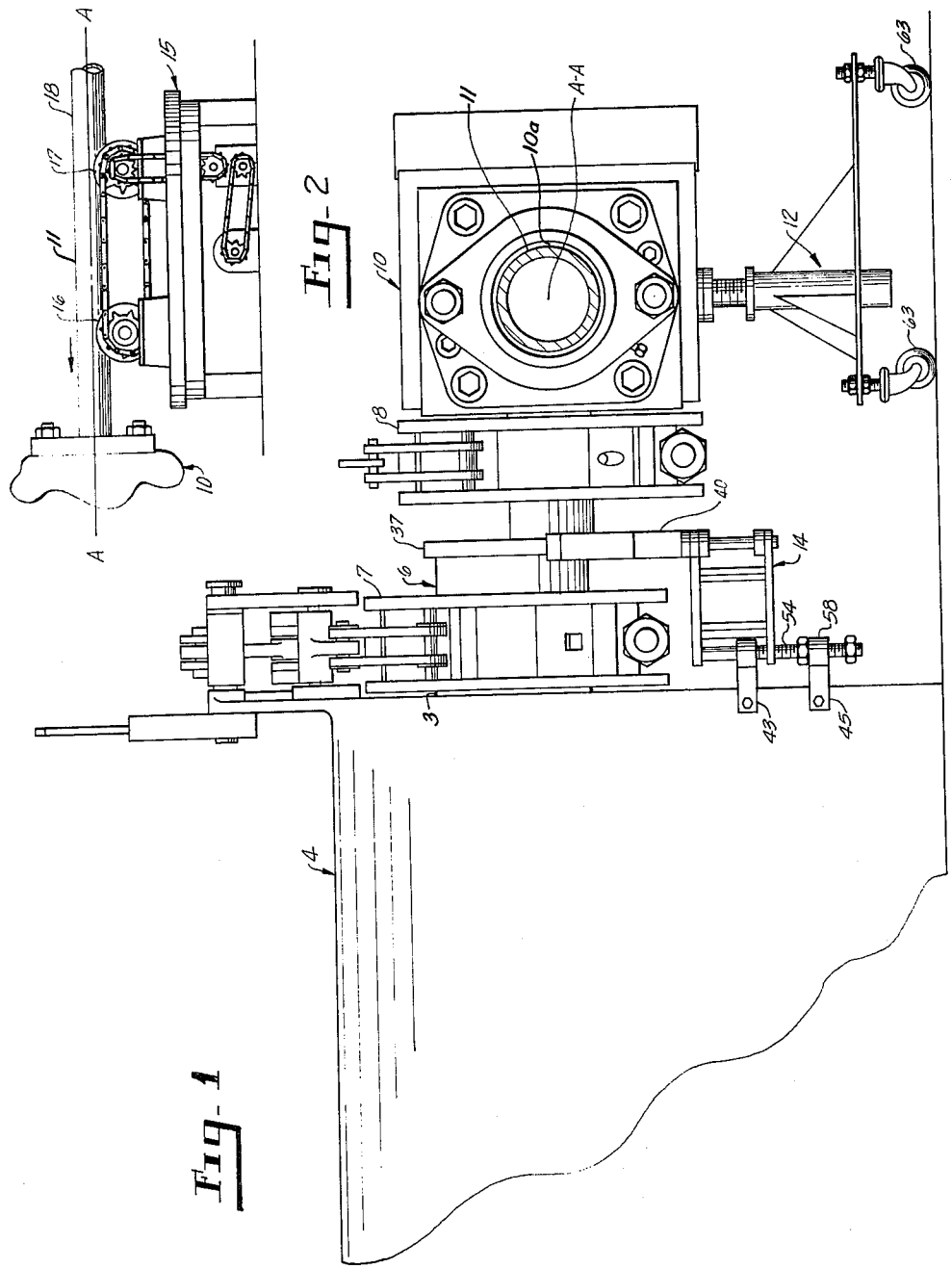

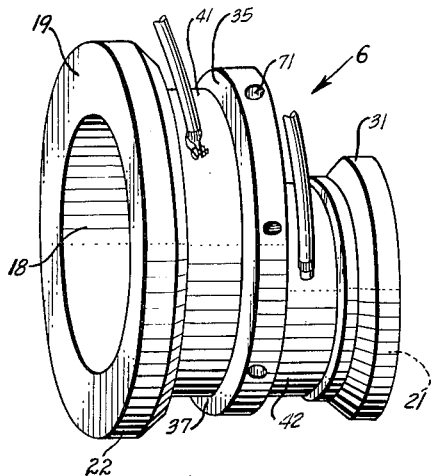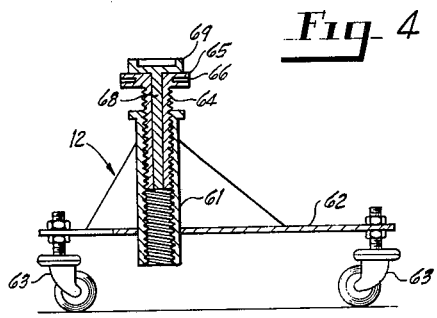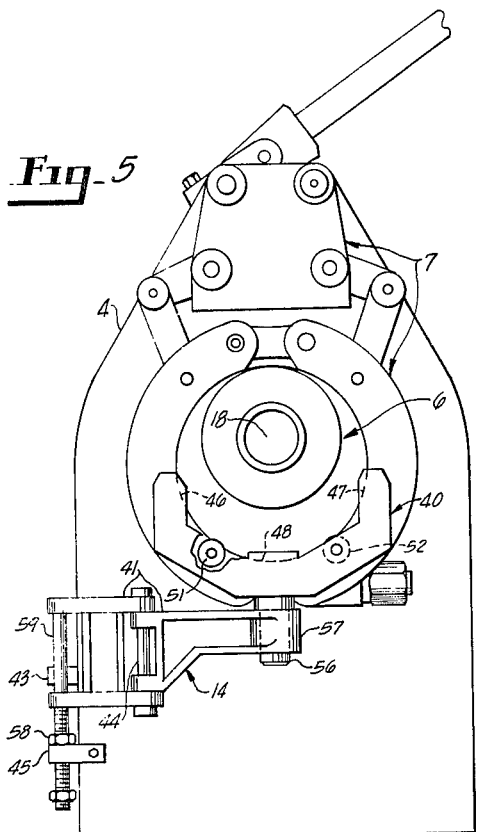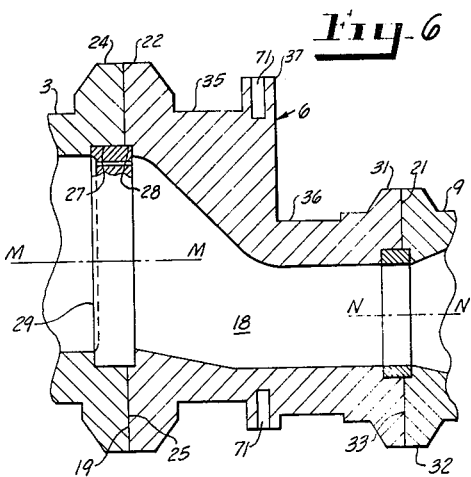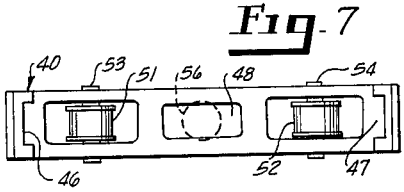

3,216,080
EXTRUSION APPARATUS FOR COATING PIPE
Charles E. Norton, Chicago, Ill., assignor, by mesne assignments, to Midland-Ross Corporation, Cleveland, Ohio, a corporation of Ohio
Filed Oct. 12, 1962, Ser. No. 230,068
9 Claims. (Cl. 25—38)

The present invention relates to apparatus for extruding a plastic tube-like coating onto surfaces of elongated articles of uniform cross section, such as pipes.

The apparatus conventionally used includes a screw-type extruder with walls capable of transferring heat into a thermosensitive resin passed therethrough, and a cross head into which the resin passes from the extruder into a chamber of the cross head comprising a mandrel and a forming die. The mandrel has a central opening generally complementary to the external surface of the pipe or other article to be passed through the cross head. The die and the mandrel form an annular orifice adjacent the pipe periphery through which resin flows onto the pipe.

In coating various sizes of pipe up to, e.g., pipes varying ½ inch to 6 inches in diameter, the same extruder may be used but the size of the die and the mandrel must be changed and even the size of the cross head may need to be changed.

In passing the larger sizes of pipes to, through, and from the cross head, it is found preferable to maintain conveying equipment of the pipe at a fixed level rather than to vertically adjust the conveying equipment to maintain the longitudinal axis of pipe travel at a fixed level or a level which is fixed relative to the discharge port of the extruder.

Hence, it is a primary object of this invention to provide pipe-coating apparatus of the plastic-tube-forming type wherein the fixture for directly applying the plastic material to the pipe is readily adjustable in a vertical direction in accordance with the size of the pipe which must be passed over conveying equipment of fixed level.

It is a further object to provide equipment of the above recited object adapted for heating or cooling to control or maintain desired physical and chemical condition of the coating material passing therethrough.

A further object is to modify existing equipment with a minimum of new construction.

In brief, this invention achieves above objects and any other objects and advantages which may appear in the description below in the provision of an apparatus comprising an extruder, a cross head for directly applying the coating material to the pipe as it proceeds along a travel axis through the cross-head, and a duct, rotatable relative to the extruder and the cross head to effect the transfer of material therebetween at various levels of the cross-head relative to the extruder.

The extruder and the cross head have a discharge port and a feed port, respectively, which terminate in exterior-annular end surfaces normally spaced by the duct. The duct has oppositely-facing annular end surfaces which are substantially concentric to separate parallel axes and mate with the annular port surfaces to provide a passageway for the coating material to flow from the extruder to the cross head. The duct is rotatable relative to the extruder and the cross head to different positions disposing the cross head at different elevations relative to the extruder. Each pair of mating surfaces when the duct mates with the extruder or the cross head maintain circumferentially continuous leak proof engagement concentrically with its respective axis. The apparatus further includes means for clamping the duct to the extruder and cross head to maintain both pairs of mating surfaces in said engagement.

In the drawing with respect to which the invention is described:

FIG. 1 is a fragmentary elevation showing a portion of an extruder for a viscous material, a cross head supported on a mobile jack, and a rotatably adjustable duct disposed between and connecting the extruder and the cross head.

FIG. 2 is a fragmentary schematic elevation illustrative of a pipe and mechanism for advancing it into the cross head of FIG. 1.

FIG. 3 is a perspective view of the adjustable duct of FIG. 1.

FIG. 4 is an elevation in section of a mobile vertically adjustable support or jack for the cross head.

FIG. 5 is an elevation of the extruder and the duct as viewed along longitudinal axes thereof with the cross head removed.

FIG. 6 is a longitudinal cross section of the duct shown in FIG. 2 in cooperating relation with adjacent flange proportions of the extruder and the cross head.

FIG. 7 is a plan view of a yoke shown also in FIG. 5 as a support for the duct.

FIG. 1 illustrates the apparatus of the invention in general arrangement wherein a discharge port 3 (see FIG. 5) of extruder 4 is clamped to a duct 6 by a clamp 7. The duct 6 is connected by another clamp 8 to the feed port 9 (see FIG. 1) of a cross head 10. The cross head 10 is provided with an opening 10a concentric to an axis A—A through which extends a pipe 11 as shown in FIG. 1. The cross head 9 is arranged as shown by FIGS. 1, 2, 5, and 6 considered together, in lateral relation with the opening 10a and the axis A—A. The cross head is, to a major extent, supported by a mobile vertically-adjustable jack 12. The duct 6 rests on a horizontally extendable support 14 serving essentially to support the duct 6 on occasions such as when it is unclamped from the extruder and the cross head to effect adjustment or other handling thereof.

In most pipe coating operations, pipe conveyors and supports of fixed height are preferred. Illustrated in FIG. 2 is one type of pipe conveyor 15 comprising a pair of "hourglass" rolls 16 and 17 on which the pipe 11 rests after it issues from the opening 10a of the extruder along the axis A—A. The rolls rotate on axes in horizontal transverse relation with the direction of the pipe travel to longitudinally advance a pipe.

Keeping the primary purpose of the invention in mind, i.e., the raising and lowering of the cross head 10 and hence, the travel axis A—A of pipe travel through the cross head relative to a conveyor of fixed height, the duct 6 has a longitudinal passageway 18 opening at each end of the duct along the inner peripheries of annular end surfaces 19, 21. The termini of the passageway are circular and concentric along with surfaces 19 and 21 to parallel axes M—M and N—N, respectively. The larger or coating-material-receiving end of the duct 6 is formed by a flange 22 forming the end surface 19 and mates with a flange 24 of the extruder forming the terminus of the extruder discharge port 3. This port terminates in an end surface 25 mating with the surface 19 of the duct. The port and the duct are interiorly recessed at 27 and 28, respectively, to accommodate a resilient washer 29 precluding the entry of any coating material between the surfaces 19 and 25.

In a similar fashion the end portion of the duct from which material passes into the cross head comprises a flange 31 which forms the end surface 21. The feed port 9 of the cross head has a mating flange 32 forming an end surface 33 of this port which mates with the surface 21 of the duct. The surface 33 is centered about an axis in transverse relation to the length or axis of the opening 10a. As shown, each pair of opposed end surfaces engage along a common plane. However, adjacent flanges of the duct, the extruder and the cross head may be formed with other types of coaxial, concentric mating surfaces of revolution which effect leakproof mating engagement and rotatability of the duct relative to the extruder and the cross head.

The duct 6 is further provided with cylindrical surfaces 35 and 36 (see FIG. 6) separated by a circular flange 37 occurring longitudinally intermediately of the ends of the duct. The surfaces 35 and 36 are useful in supporting heating media such as the electrical band type heaters 41, 42 shown in FIG. 3 secured to surfaces 35, 36.

In operation, the axis M—M of the discharge port 3 of the extruder remains fixed while the axis N—N of the feed port 9 of the cross head is changed in accordance with rotation of the duct 6 about the axis M—M concentric with adjacent ends of the extruder and the duct. Hence, the axis N—N while being shifted to a desired elevation is also shifted in the horizontal direction because of its eccentric relationship with axis M—M.

Concentricity of the flange 37 with the axis M—M enables the duct to be supported from the main body of the extruder 4 by a yoke 40 arranged as a portion of the support 14 to embrace a lower portion of the periphery of flange 37. The support 14 also includes an extendable plural sectioned bracket 41 hinged on a vertical axis at hinges 43, 45 fixed to the extruder. The yoke 40 is mounted by extension of its trunnion portion 56 into a bearing portion 57 of the outer section of the bracket. The two sections of the bracket are pivotably connected by a vertical pin 44.

The principal use of the yoke 40, as stated before, is to enable rotation of the duct 6 on occasions when the elevation of the cross head has to be changed. To facilitate rotation of the duct 6 relative to the yoke, the yoke is formed with grooves at 46, 47 and 48 within which the duct flange 37 is received to establish guide relation to the flange with the yoke. However, the yoke supports the weight of the duct essentially through the spools or rolls 51 and 52 rotatably mounted within the yoke on pins 53 and 54, respectively. Preferably, the duct flange 37 is spaced between the ends of the duct to intersect with the center of gravity of the duct 6. As a consequence, the duct will be balanced in the longitudinal direction of the duct and easily rotated relative to the yoke 40 when freed of the extruder and the cross head.

To disengage the yoke from the flange 37, the yoke is lowered by turning a nut 58 in threaded relation with a hinge pin 59 which extends vertically through bearing brackets 43 and 45. The nut 58 rests on the upper surface of the bracket 45. Changes in elevation of the cross head 10 also entail adjustment of the mobile jack 12.

The jack 12 comprises a frame portion having an internally threaded tube 61 extending through, and fastened to, a horizontal base 62 to which are secured three casters 63 arranged in triangular relationship about the tube 61. The tube 61 receives an externally threaded sleeve 64 in threaded relation therewith having a collar 65 fixed to its upper end portion to facilitate its manual rotation relative to the jack frame. The collar 65 may have, as shown, a plurality of radial holes 66 formed at uniform angular spacing about the threaded portion of the sleeve 64 for receiving a pin-like lever. The sleeve 64 receives a pin 68 having a stem portion extending in slidable relation with the smooth bore of the sleeve 64 and a head portion 69 adapted to engage the underside of the cross head 10 and rest in bearing relation on the upper surface of the collar 65.

In making an adjustment of the duct and the cross head to achieve a different elevation of the latter, the clamps 7 and 8 are released relative to respective flanges of the duct 6 and the flanges engaged therewith of the extruder and the cross head. Assuming the coating apparatus to require adjustment for coating a larger size pipe than had been previously coated, the sleeve 64 is rotated manually by a lever relative to the base portion of the jack. Practically simultaneously, the duct 6 must be rotated by torsion applied thereto by another lever applied to the flange 37 as the cross head is raised through operation of the jack. A workman will be able to sense the amount of rotation of the duct 6 required to keep up with the changes in elevation of the jack. Meanwhile, it will be necessary for the jack to change position in the horizontal direction relative to a floor or other base as the rotation of the duct 6 carries its eccentric portion including the end flange 31 adjacent the cross head in a lateral direction. After the desired adjustment is effected, the clamps 7 and 8 are again engaged with respective flanges to re-establish the sealed, continuous duct relationship of the extruder, the duct 6 and the cross head. The cross head may thus be raised or lowered as indicated by the elevating procedure just described.

The terms and expressions which have been employed are used as terms of description and not of limitation and there is no intention of excluding such equivalents of the invention described or of the portions thereof as fall within the scope of the claims.

What is claimed is:

1. Apparatus for applying a viscous coating material to an elongate article of uniform cross section comprising:
   (A) an extruder for the material having a discharge port terminating in an annular end surface;
   (B) a cross head having an opening for lengthwise movement of said article along a travel axis therethrough, and a feed port terminating in an exterior annular end surface centered about, and facing away from said travel axis along an axis in transverse relation with said travel axis;
   (C) a rotatably adjustable duct disposed between the extruder and the cross head connecting said discharge port and said feed port, the duct having oppositely-facing annular end surfaces which are substantially concentric to spaced parallel axes in fixed relation with the duct and mate with said annular port surfaces; and
   (D) means for clamping opposite end portions of the duct to the extruder and the cross-head to seat each end surface of the duct against, and in concentric relation with, its respective mating surface of said port surfaces, said clamping means being releasable for adjustment of the duct relative to the extruder and the cross head;
   (E) said duct being rotatable relative to the extruder and the cross head through a partial revolution, when the clamping means is released, to raise or lower the cross head relative to the extruder.

2. The apparatus of claim 1 wherein:
said ports and the duct each have a radially extending flange means concentric to and adjacent each of said annular surfaces and tapering in a radially outward direction therefrom; and
said clamping means engage the outward facing sides of each pair of proximate or engaged flanges.

3. The apparatus of claim 1 wherein:
   (A) said duct comprises an annular flange spaced intermediately of said aforementioned flange means and in coaxial relation with said end surface adjacent the extruder; and said apparatus comprises:
   (B) supporting means mounted in fixed relation with the extruder comprising a yoke engaging a lower portion of the periphery of said intermediate flange.

4. The apparatus of claim 3 wherein:
said flange means comprises an annular flange at each end of the duct; and
said supporting means comprises an arm in hinged relation along a vertical axis with the extruder and is extendible in a horizontal direction.

5. The apparatus of claim 1 wherein:
said flange means comprises an annular flange at each end of the duct; and
said duct comprises a flange spaced intermediately of said aforementioned flanges by cylindrical surfaces adapted for receiving band-type heating media.

6. The apparatus of claim 1 comprising:
supporting means for the cross head including means enabling adjustment in a vertical direction and in a horizontal direction transversely to said parallel axes.

7. The apparatus of claim 6 wherein:
said supporting means is a carriage mounted on caster wheels.

8. A duct for adjustably connecting a pipe-coating cross-head at preselected elevations with an extruder for plastic materials comprising:
(A) a wall laterally enclosing a longitudinal passageway of the duct;
(B) annular end flanges in which said wall terminates, the flanges being concentric to opposite ends of the passageways, each flange being concentric to one of a pair of parallel axes, said flanges tapering radially outwardly to respective outer circumferences adapting the duct for receiving clamping means along each flange and attachment to the extruder and the cross-head;
(C) the duct having annular end surfaces concentric with said axes adapting the duct to be disposed between mating ports of the extruder and the cross-head;
(D) an annular flange spaced intermediately of the end flanges in coaxial relation with one flange; and
(E) said wall having two exterior cylindrical surfaces separated by said intermediate flange, each cylindrical surface comprising substantially the exterior wall surface between the intermediate flange and the adjacent end flange.

9. The duct of claim 8 wherein:
the passageway is smoothly tapered and of circular transverse cross section between points of maximum diameter and minimum diameter.

References Cited by the Examiner
UNITED STATES PATENTS

| | | | |
|---|---|---|---|
| 785,637 | 3/05 | Schlickeysen | 25—14 |
| 2,044,961 | 6/36 | Waner | 18—14 |
| 2,171,095 | 8/39 | Orsini | 18—14 |
| 2,636,218 | 4/53 | Orsini | 18—14 |
| 2,945,278 | 7/60 | Robertson | 25—38 |

WILLIAM J. STEPHENSON, *Primary Examiner.*

ROBERT F. WHITE, *Examiner.*